July 5, 1932.  I. J. LICHTER  1,865,700

HUMIDOR

Filed May 23, 1930

INVENTOR
*Ira Jean Lichter*
BY
*Bartlett Eyre Scott & Keel*
ATTORNEYS

Patented July 5, 1932

1,865,700

UNITED STATES PATENT OFFICE

IRA JEAN LICHTER, OF TEANECK, NEW JERSEY, ASSIGNOR OF ONE-HALF TO CROSBY GAIGE, OF NEW YORK, N. Y.

HUMIDOR

Application filed May 23, 1930. Serial No. 454,898.

This invention relates to humidors.

The object of the invention is a humidor characterized by its simplicity in construction, and by its reliability and dependability in the maintenace of the desired moist atmosphere with a minimum of care and attention. A further object of the invention is a humidor moistening unit which is compact and readily adaptable to different shapes and types of humidor casings. A further object of the invention is a humidor in which a slow rate of evaporation is obtained and the reserve moisture supply is gradually and slowly furnished to the device without the necessity of the use of wicks and circulation on the capillary principle. A further object is a moistening unit which is of few parts and inexpensive to build.

For a better understanding of the invention reference may be had to the accompanying drawing forming a part of this application wherein.

Figure 1:
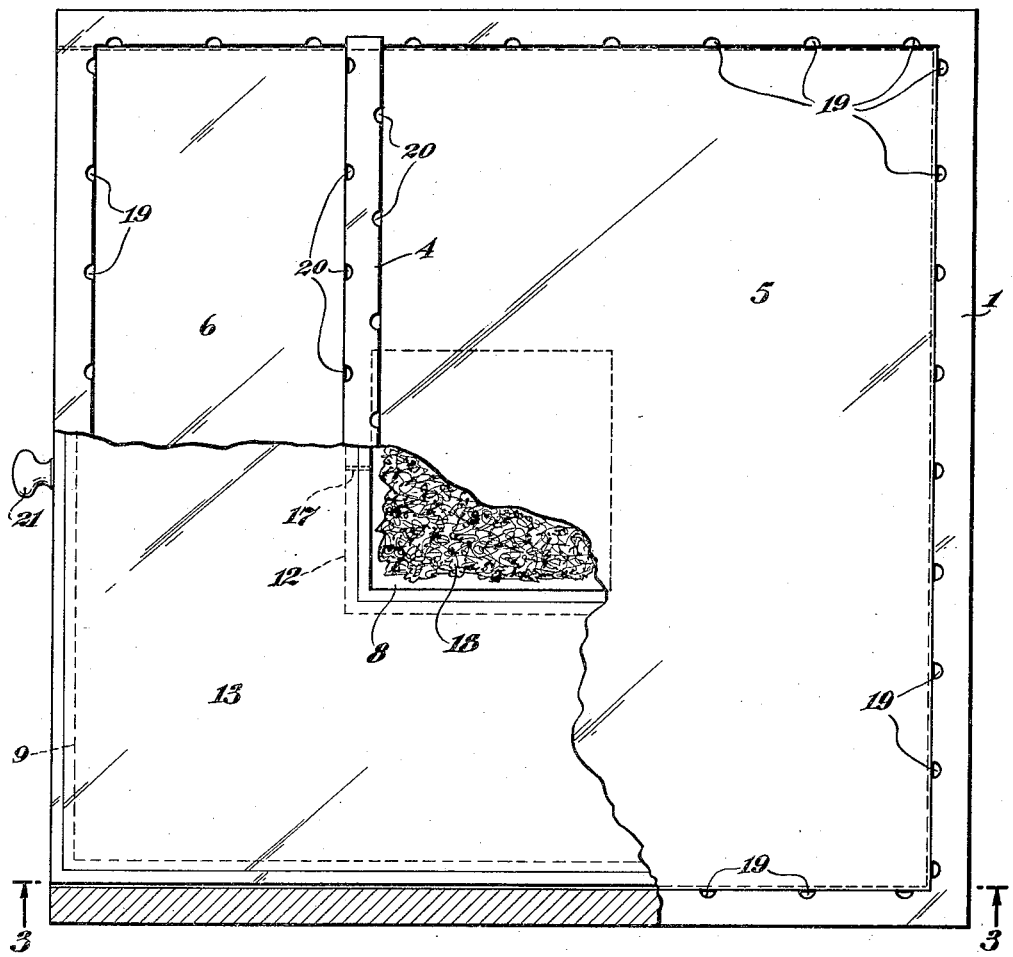
Fig. 1 is a plan view of a humidor embodying the invention with certain parts broken away and the top removed.
Figure 2:
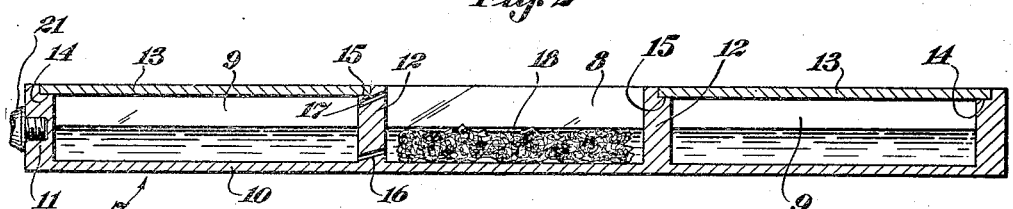
Fig. 2 is a cross section through the moistening unit.
Figure 3:
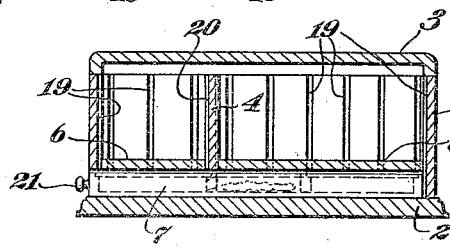
Fig. 3 is a sectional view through the assembled unit along the line 3—3 of Fig. 1.

Referring to the drawing I have illustrated my invention as embodied in a humidor including a casing 1 having a bottom 2 and a cover or lid 3. The casing is provided with a partition 4 dividing the same into two compartments having false bottoms 5 and 6 for these compartments, leaving a compartment between the false bottoms and the bottom 2 for a humidor moistening unit 7 to be described. This unit in the particular embodiment shown conforms to the shape of the interior of the casing and substantially fills the compartment below the false bottoms 5 and 6, although as will appear the invention is not limited to any particular shape or size of humidor casing or moistening unit. The unit 7 includes a small open evaporating receptacle or pan 8 which is surrounded by a water container 9. In the particular embodiment shown the walls are formed of insulating material, such for example as bakelite or other similar material, the evaporating pan 8 and the reserve supply chamber 9 being a molded block of bakelite or other resinous condensation product to form an integral bottom 10 and side walls 11, the side walls 12 of the evaporating pan 8 being also integral with the bottom 10 and the side walls 11. The top 13 is formed of one integral piece having an opening corresponding to the evaporating pan 8, the same being fitted on to the upper sides of the side walls 11 and inner walls 12 by rabbeting, as for example resting upon the shoulders 14 and 15 formed respectively on the upper inner edges of the walls 11 and the upper outer edges of walls 12. The top 13 is permanently glued or otherwise sealed in position so as to form a substantially airtight connection. The transfer of the moistening liquid from the reserve chamber 9 which surrounds the evaporation pan 8 into the latter takes place through a small circulating passage or passages 16 formed in one or more of the walls 12 of the evaporating pan, the dimensions of this passage 16 being so small as to prevent any appreciable thermal interchange of fluid between the two chambers 8 and 9, the fluid in chamber 9 flowing substantially only in one direction, namely, into the chamber 8 as the evaporation gradually takes place. Another passage 17 is provided in one of the walls 12 up above the level of the fluid in the chambers 8 and 9 in order to equalize the air pressures in the two chambers and to assure the gradual transfer of fluid from reserve chamber 9 into chamber 8 as depletion thereof in the latter chamber occurs. If desired, the evaporating pan or chamber 8 may contain a sponge 18 or other suitable similar material for preventing splashing in the evaporating pan. As the air in the pan 8 becomes moist a sufficient quantity thereof is transferred to the compartments above the false bottoms 5 and 6 through the ventilation openings 19 formed in the side walls of the casing 1 and similar openings 20 formed in the partition 4 down past the false bottoms. For replenishing the moistening liquid in the reserve chamber 9 the moistening unit may, of course, be provided with a suitable filling opening, although I have found that the fluid supply may be replenished with sufficient rapidity for practical purposes by simply pouring it into the chamber 8, the levels in the two chambers gradually equalizing through the openings 16 whereupon the normal operation is again begun.

In the particular embodiment illustrated the moistening unit 7 is inserted underneath the false bottoms 5 and 6 through an opening provided on one side, a knob or finger hold 21 being provided for facilitating the removal and insertion of the unit. Preferably the unit 7 forms a close fit in the opening in the side of the casing so as to prevent any substantial interchange of air between the interior of the moistening unit compartment and the outside.

I have found that a humidor of this construction will operate a very long period without the necessity of replenishing the liquid in the reserve chamber 9, a small quantity of such liquid in the chamber 9 being adequate to supply the needs of the humidor for more or less indefinite periods, the reserve chamber 9 itself being thoroughly insulated against interchange of heat with substantially no evaporation of the liquid therein and the disposal of the insulated reserve chamber 9 about the evaporating pan 8 functions to prevent excessive evaporation from the pan 18, the evaporation of the water contained therein taking place at a very slow and gradual rate; also the disposition of the moistening unit below the cigar and cigarette compartments together with the particular constructional arrangement shown contributes towards the gradual and slow evaporation of the water to meet the exact requirements. The moistening unit can obviously be made to fit into any shape or size of humidor casing, and the manufacture thereof out of bakelite or similar resinous condensation product in the manner indicated contributes toward the advantages above enumerated.

I claim:

1. A humidor including a moistening unit having an evaporating pan surrounded by a reserve moistening liquid chamber with a small attenuated transfer passage between the pan and the reserve chamber permitting the gradual feeding of the reserve liquid into the evaporating pan, but preventing the thermal interchange through flow of liquid between the pan and the chamber.

2. A humidor including a moistening unit having an evaporating pan surrounded by a reserve, moistening liquid chamber with a small attenuated transfer passage between the pan and the reserve chamber to permit the gradual equalization of the levels therein.

3. A humidor of the character set forth in claim 2 wherein the reserve chamber is closed to the outside air except through one or more small attenuated air pressure equalization passages.

4. A humidor of the character set forth in claim 2 wherein the moistening unit is disposed in the lower part of the humidor.

5. A humidor of the character set forth in claim 2 wherein the moistening unit is disposed in the lower part of the humidor with a false bottom above the moistening unit and ventilating openings leading up to the humidor chamber.

6. A humidor of the character set forth in claim 2 wherein the moistening unit is formed of an insulating product.

7. A humidor of the character set forth in claim 2 wherein the moistening unit is disposed in the lower part of the humidor with a false bottom disposed immediately above the same and fitting tightly within the interior of the casing, ventilation openings being provided between the upper part of the humidor and the moistening unit compartment.

8. A humidor including a moistening unit having an evaporating pan with a reservoir moistening liquid chamber juxtaposed thereto and with a small attenuated transfer passage between the pan and reservoir chamber permitting the gradual feeding of the reservoir liquid into the evaporating pan but preventing substantial thermal interchange through the transfer of liquid between the pan and the chamber, said reserve liquid chamber being insulated against heat transfer and sealed against the atmosphere except through said transfer passage.

In testimony whereof, I have signed my name to this specification.

IRA JEAN LICHTER.